United States Patent [19]
Thesling

[11] Patent Number: 5,883,478
[45] Date of Patent: Mar. 16, 1999

[54] APPARATUS AND METHOD FOR CONTROLLING VIBRATING EQUIPMENT

[75] Inventor: William Henry Thesling, Brunswick, Ohio

[73] Assignee: TS Engineering Inc., Eastlake, Ohio

[21] Appl. No.: 728,762

[22] Filed: Oct. 11, 1996

[51] Int. Cl.⁶ .......................... H02K 33/00; B65G 27/32
[52] U.S. Cl. .......................... 318/119; 318/128; 198/762
[58] Field of Search .................. 318/119, 126, 318/127, 128; 198/752.1, 761, 762; 363/21

[56] References Cited

U.S. PATENT DOCUMENTS

| | | | |
|---|---|---|---|
| Re. 33,937 | 5/1992 | Schubert | 267/136 |
| 3,748,553 | 7/1973 | Reiner | 318/128 |
| 3,864,618 | 2/1975 | Hammond | 318/227 |
| 4,053,817 | 10/1977 | Yeasting | 318/128 |
| 4,083,433 | 4/1978 | Geohegan Jr. et al. | 188/1 B |
| 4,101,816 | 7/1978 | Shepter | 318/132 |
| 4,216,416 | 8/1980 | Grace | 318/128 |
| 4,240,081 | 12/1980 | Devitt | 346/75 |
| 4,300,083 | 11/1981 | Heiges | 318/686 |
| 4,331,263 | 5/1982 | Brown | 222/63 |
| 4,350,243 | 9/1982 | Weyandt | 198/769 |
| 4,395,665 | 7/1983 | Buchas | 318/114 |
| 4,483,425 | 11/1984 | Newman | 188/378 |
| 4,496,884 | 1/1985 | Hamer et al. | 318/114 |
| 4,637,307 | 1/1987 | Miller | 101/93.04 |
| 4,754,226 | 6/1988 | Lusignan et al. | 328/158 |
| 4,941,078 | 7/1990 | Leonardi | 363/97 |
| 5,006,973 | 4/1991 | Turner | 363/34 |
| 5,074,403 | 12/1991 | Myhre | 198/751 |
| 5,080,218 | 1/1992 | Izume et al. | 198/751 |
| 5,086,382 | 2/1992 | Feldkeller et al. | 363/21 |
| 5,136,494 | 8/1992 | Akagi et al. | 363/34 |
| 5,142,217 | 8/1992 | Gontowski, Jr. | 323/272 |
| 5,381,328 | 1/1995 | Umezawa et al. | 363/41 |
| 5,409,101 | 4/1995 | Ahmed et al. | 198/750 |
| 5,456,341 | 10/1995 | Garnjost et al. | 188/378 |
| 5,486,994 | 1/1996 | Pouliquen et al. | 363/98 |
| 5,519,307 | 5/1996 | Moon | 323/222 |

*Primary Examiner*—Clayton LaBalle
*Attorney, Agent, or Firm*—Calfee, Halter & Griswold LLP

[57] ABSTRACT

Apparatus for controlling vibratory machines of the type having at least one electromagnetic drive coil to drive a member at a resonant frequency includes a DC power supply; a programmable controller that produces PWM control signals that when applied to the drive coil cause vibrating motion; a switching driver circuit that applies a drive waveform to the drive coil by switching DC power to the drive coil in response to the PWM control signals; and a motion sensor that detects vibration amplitude; the controller tracking resonant vibration frequency as a function of an amplitude signal related to the drive waveform. The motion sensor preferably produces a signal related to vibration velocity.

39 Claims, 11 Drawing Sheets

APPARATUS AND METHOD FOR CONTROLLING VIBRATING EQUIPMENT

BACKGROUND OF THE INVENTION

The invention relates generally to control techniques for vibratory equipment. More particularly, the invention relates to the use of a programmable electronic control system for vibratory equipment that includes pulse width modulated drive signals, vibration amplitude and resonant frequency tracking.

Various material handling systems use vibration as a method for feeding and orienting parts for use in automated assembly processes. For example, a feeder bowl is a well-known device used to orient and feed parts. The bowl is mounted on a number of inclined springs, and typically vibrates in a rotational manner. Parts are dropped or otherwise placed in the bowl interior and the rotational vibration causes the parts to "walk" up a helical shelf within the bowl. Tooling is placed along the shelf to orient and/or sort the parts as needed for the next stage of the assembly process. A number of electromagnets are used to apply a mechanical force to the system to cause the vibratory motion.

The primary mode of vibration is resonance. The bowl and mounting springs together form a mass-spring mechanical system that exhibits a natural frequency of vibration or resonant frequency. Typically, the system is mechanically "tuned" by adding or removing springs so as to force by design the resonant frequency to be near 60 Hz or 120 Hz. These frequencies are selected so that standard 60 Hz outlet power can be used to drive the electromagnets.

Most feeder bowls are driven open loop, meaning that the vibration intensity is controlled simply by using a variable transformer, for example, or some other means for manually regulating the drive voltage. Such open loop control techniques tend to be sensitive to line voltage variations, load changes, spring wear and other dynamic conditions that result in inconsistent control of the vibration envelope. For applications involving larger bowls, such open loop control is not desirable. Closed loop control systems are known but tend to be application specific. Closed loop control systems typically attempt to drive the feeder bowl at its resonant frequency and use sensors for vibration amplitude feedback. The known systems tend to use expensive and complicated linear drive circuits and control techniques, and also consume excessive power.

The objectives exist, therefore, for a closed loop control apparatus and method for controlling vibration frequency and amplitude in vibratory equipment. Such apparatus, in contrast to previously known systems, preferably will be realized with minimal circuitry to reduce design and manufacturing costs and operate with lower power consumption to reduce operating costs, while providing fast response to system disturbances that produce changes in the resonant frequency and vibration amplitude. Such apparatus preferably will have universal application across a wide variety of systems, such as, for example feeder systems of substantial size variations (e.g. feeder bowls of six inch to forty-eight inch diameters) and a wide variety of vibration frequencies.

SUMMARY OF THE INVENTION

The present invention contemplates, in one embodiment, apparatus for controlling vibratory machines of the type having at least one electromagnetic drive coil to drive a member at a resonant frequency includes a DC power supply; a programmable controller that produces PWM control signals that when applied to the drive coil causes vibrating motion; a switching driver circuit that applies a drive waveform to the drive coil by switching DC power to the drive coil in response to the PWM control signals; and a motion sensor that detects vibration amplitude; the controller tracking resonant vibration frequency as a function of an amplitude signal related to the drive waveform.

The present invention also contemplates the methods embodied in the use of such apparatus as well as in another embodiment, a method for controlling vibration amplitude and resonant frequency characteristics of vibratory equipment of the type having at least one electromagnetic drive coil, the method including the steps of: a) applying PWM drive signals to the drive coil to produce a selected vibratory motion; b) detecting the vibratory motion with a motion sensor; c) producing an amplitude drive control signal based on a selected vibration amplitude setpoint and the detected vibratory motion; and d) producing a frequency drive control signal based on the amplitude drive control signal; the amplitude and frequency drive control signals being used to produce the PWM drive signals.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
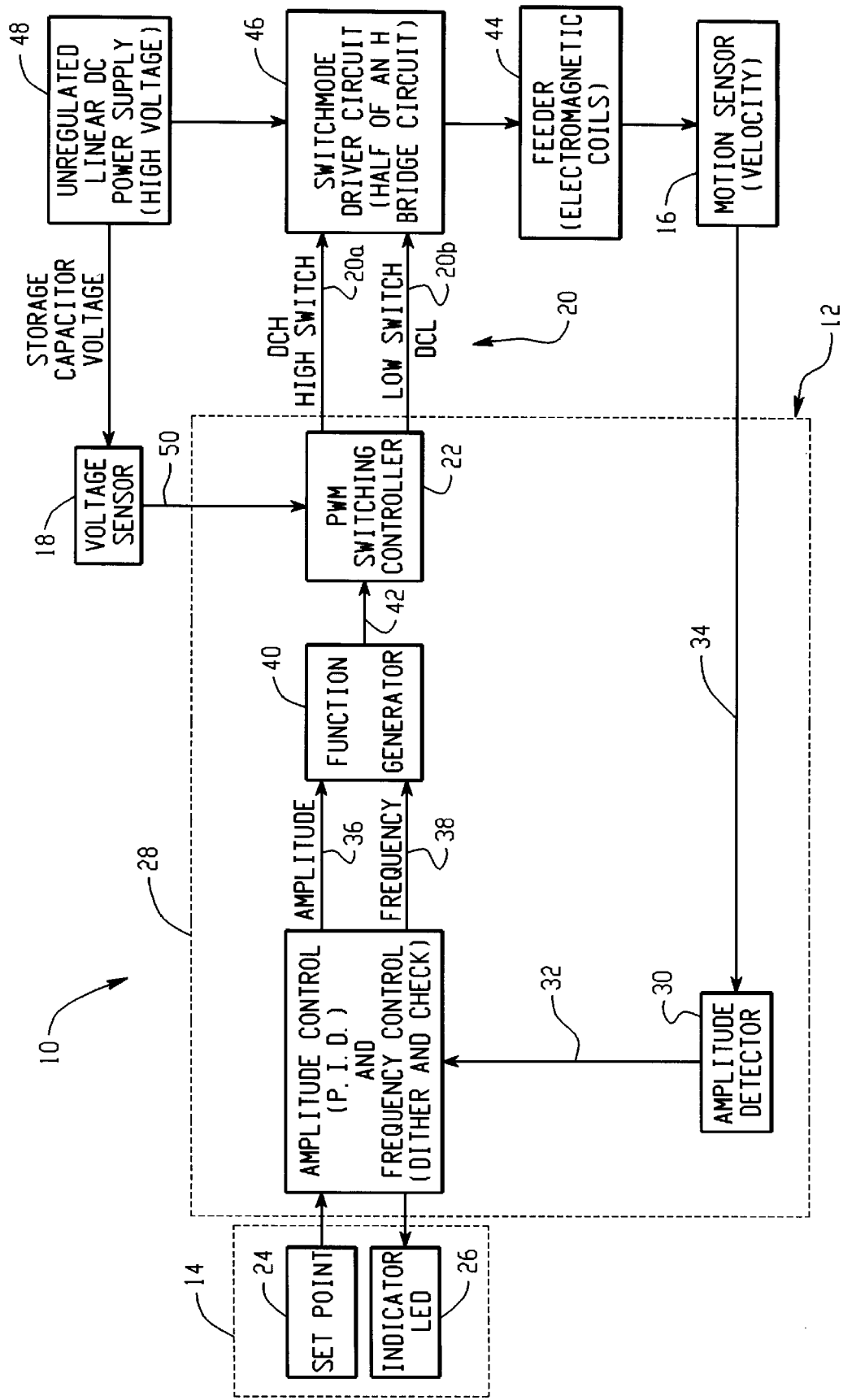
FIG. 1 is a functional block diagram of a control system in accordance with the present invention for controlling vibratory equipment.

With reference to the drawings, an embodiment of the invention is illustrated in FIG. 1 in a manner that it typically could be used in connection with a vibratory apparatus such as a feeder bowl. Although the invention is described herein with specific reference to use of the invention for controlling feeder bowl operation, such description is intended to be exemplary in nature for explaining the various aspects of the invention and should not be construed in a limiting sense. Those skilled in the art will appreciate that the invention has application to many different types of electromechanical vibrating systems.

With reference to FIG. 1, a control system 10 in accordance with the present invention is generally designated with the numeral 10. In this embodiment, the control system 10 includes a programmable controller 12, such as, for example, part no. PIC16C73A available from Microchip Technology Inc. Other programmable controllers, including microcomputers, microprocessors and so on can be alternatively used as required for a specific application. The controller 12 performs numerous functions, and can be programmed in a conventional manner according to the manufacturer's specifications. In accordance with the invention, some of the important functional aspects of the controller 12 include receiving input signals from a user interface 14, receiving feedback signals from a motion sensor 16, and receiving a voltage sense input signal from a voltage sensor 18. The controller 12 preferably is of the type that produces pulse width modulated (hereinafter "PWM") output signals 20, in this case a High switch output 20a, "DCH" and a Low switch output 20b, "DCL." It should be noted at this time that the various functions described herein in connection with the controller 12 are performed in software, as set forth in greater detail in the flow charts. In this particular embodiment, the microcontroller 12 includes a PWM switching control routine 22 that is programmed to produced the desired PWM output signals DCH and DCL. The use of PWM drive signals in this embodiment of the present invention facilitates incorporating all the essential control functions in software, thereby substantially reducing hardware requirements and also increasing the flexibility of the control system 10 to be used on different vibrating equipment. The control system 10 is thus greatly reduced in complexity, cost and hardware, because the control system 10 simply needs the appropriate software-based control functions, as set forth herein, and any suitable drive circuit that converts the PWM output signals 20 to the appropriate drive voltage/current wave forms to achieve the desired applied forces to the feeder.

The user interface 14 includes a panel mounted potentiometer or other suitable input control device (See FIG. 2) that is used by the operator to command a selected vibration amplitude or intensity setpoint 24 input to the controller 12. An indicator light 26, such as an LED, can be lit by the controller 12 to indicate to the operator when the feeder vibration intensity is at or near the selected setpoint. Other output devices (not shown) can be provided as required to provide additional information to the operator while the system is running.

The controller 12 includes an amplitude and frequency control algorithm routine 28 which is the primary control algorithm for closed loop vibration amplitude control and resonant frequency tracking. In this embodiment of the invention, amplitude control is carried out by comparing the commanded vibration intensity setpoint 24 with an amplitude feedback signal produced by an amplitude detector 30, preferably in the form of a sampled velocity feedback signal 32 based on a velocity output signal 34 of the motion sensor 16. The amplitude control function can be implemented in any number of ways using Proportional-Integral-Differential ("PID") control techniques. In the preferred embodiment the controller 12 implements the amplitude control function based on velocity feedback information.

When the resonant frequency changes, the controller 12 searches for the resonant frequency and adjusts the drive signals to the feeder accordingly so as to drive the feeder at or near the resonant frequency. In the described embodiment, frequency tracking is accomplished by a dither and check method, meaning that the controller 12 changes the drive frequency in a predetermined manner to find the resonant frequency, as will be explained in greater detail hereinafter.

The result of the amplitude and frequency control algorithms is an amplitude control value or voltage signal 36 and a frequency control value or signal 38 which are used to develop appropriate PWM drive signals to the feeder coils in order to maintain the vibration amplitude at the setpoint 24 and operate the feeder at its resonant frequency. These control signals 36, 38 are input to a function generator 40. The function generator routine 40 produces a waveform output 42 for each PWM cycle, which when applied to the drive coils 44 of the feeder cause the feeder electromagnets to apply a sinusoidal vibrational force to the feeder. In this embodiment, the function generator routine 40 utilizes direct digital synthesis (DDS) to develop the appropriate waveform output 42 based on the amplitude and frequency commands 36, 38.

The PWM switching control routine 22 converts the waveform output 42 into the corresponding switching signals DCH and DCL (20a and 20b). These switching signals are used to drive power switching transistors in a switch-mode driver circuit 46. The driver circuit 46 switches DC power from a DC power supply 48 at a high PWM frequency (in the described embodiment, 4000 Hz) to the feeder 44 coils which is an inductive load. Though the PWM switching frequency is fixed at 4000 Hz, the duty cycle of the PWM signals can be varied so as to cause a variable frequency and amplitude sinusoidal drive force to be applied to the feeder.

In accordance with another aspect of the invention, the DC voltage supply 48 is monitored using the voltage sensor 18 which provides a voltage feedback signal 50 to the controller 12. The controller 12 uses the voltage feedback signal 50 as part of the control algorithm for developing the PWM signals DCH and DCL to compensate for variations in the DC supply 48. In this manner, an unregulated DC supply can be used along with a smaller, and lower cost, storage capacitor used in the supply 48. This greatly reduces the design complexity and cost of the DC supply because an unregulated supply 48 can be used with PWM drive.

In the described embodiment, the motion sensor 16 is realized in the form of a micro-machined integrated circuit accelerometer, such as part no. ADXL50 available from Analog Devices. This device is mounted on the feeder bowl and internally produces a signal that represents the feeder acceleration. The device 16 further includes an analog integrator circuit that integrates the acceleration signal to produce an output signal 34 that corresponds to the velocity of the feeder. The integrator is realized in the form of a low pass filter. Velocity feedback is preferably used in the present invention because it has been observed that of the three motion parameters, displacement, velocity and acceleration, the speed at which parts feed is generally proportional to the velocity of the feeder motion and is in large part independent of frequency. The integration also helps to reduce electrical noise caused by the PWM switching.

The velocity feedback signal 34 is input to the amplitude detector 30, which is realized entirely in software in the controller 12. The analog velocity input 34 is sampled at the PWM switching frequency, which in the described embodiment is 4000 Hz, for example. The absolute value is determined using full wave rectification, and this signal is then filtered digitally as needed to develop a low noise signal 32 that is a good estimate of the feeder velocity averaged over a selected time period such as, for example, 50 milliseconds of data. By tying the sampling of the velocity input 34 to the PWM switching frequency, the system assures that the velocity samples do not occur at the PWM switching times, thus further reducing noise effects from the PWM switching.

Figure 2:
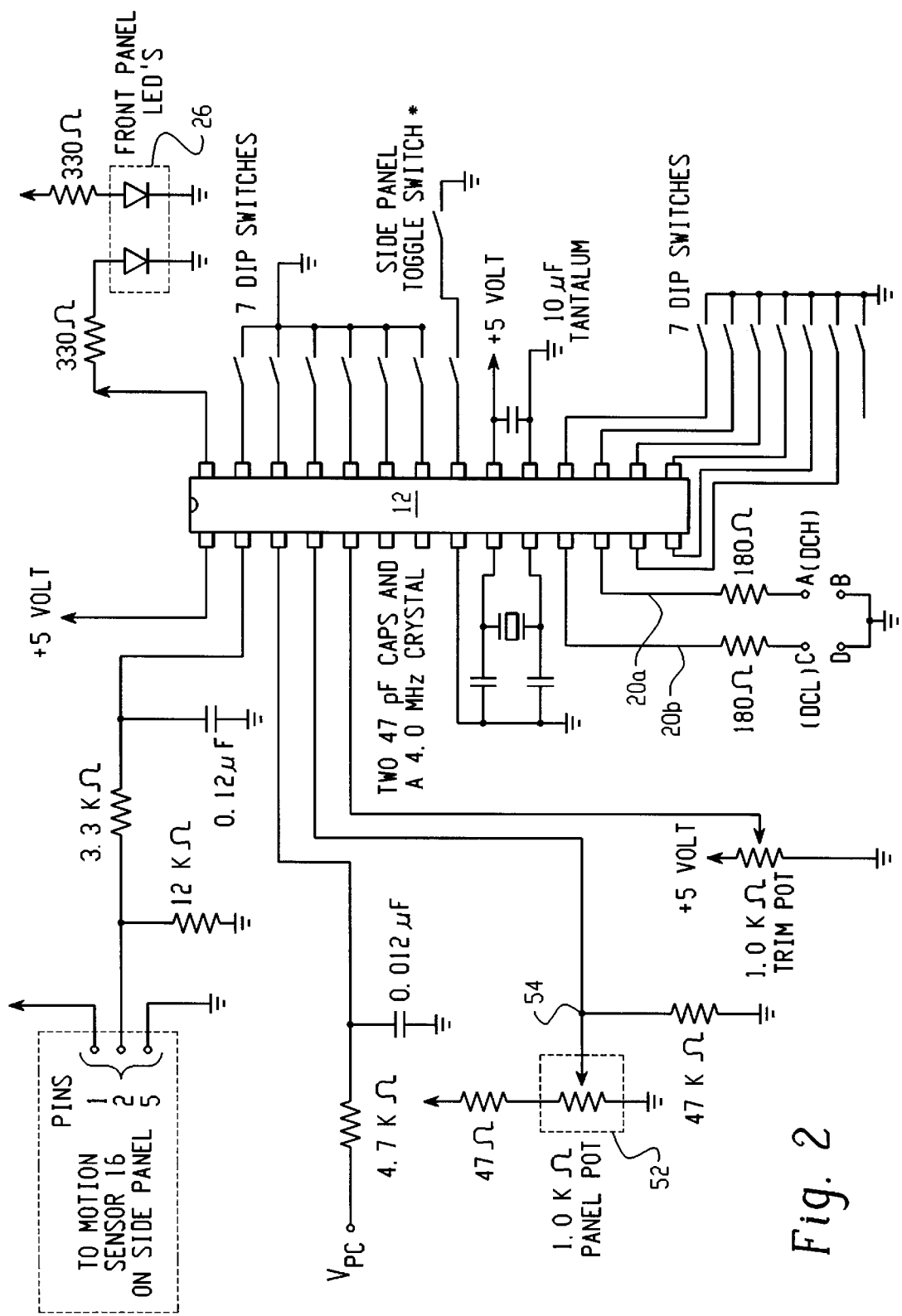
FIG. 2 is a detailed schematic diagram of a suitable input and power configuration for a controller such as can be used with the present invention.

With reference next to FIG. 2, a suitable configuration for various input connections for the controller 12 is illustrated. Many of the connections are conventional and need not be described in detail to understand and practice the present invention. Several items of note are as follows. A voltage $V_{PC}$ is provided as an analog input to an analog to digital converter input of the controller 12. This voltage represents the unregulated DC supply voltage used to drive the feeder coils and is used by the controller 12 as part of the algorithm for producing the PWM signals DCH and DCL.

A panel mounted potentiometer 52 is used as part of a resistor divider network to provide a 0–5 VDC input signal to the controller 12. The input voltage at the node 54 corresponds to the desired vibration amplitude setpoint signal 24 (see FIG. 1). The controller 12 also produces appropriate output signals for controlling the indicator LED 26 when the system is operating at the amplitude setpoint.

Various Dip switches can be used to control or change the operating modes of the controller 12 or system as required for a particular application. Additionally, the controller 12 produces the PWM control signals 20a and 20b (DCH and DCL respectively) as indicated at points A, B and C, D on FIG. 2. These nodes are connected to the correspondingly indicated nodes A, B and C, D on FIG. 3.

Figure 3:
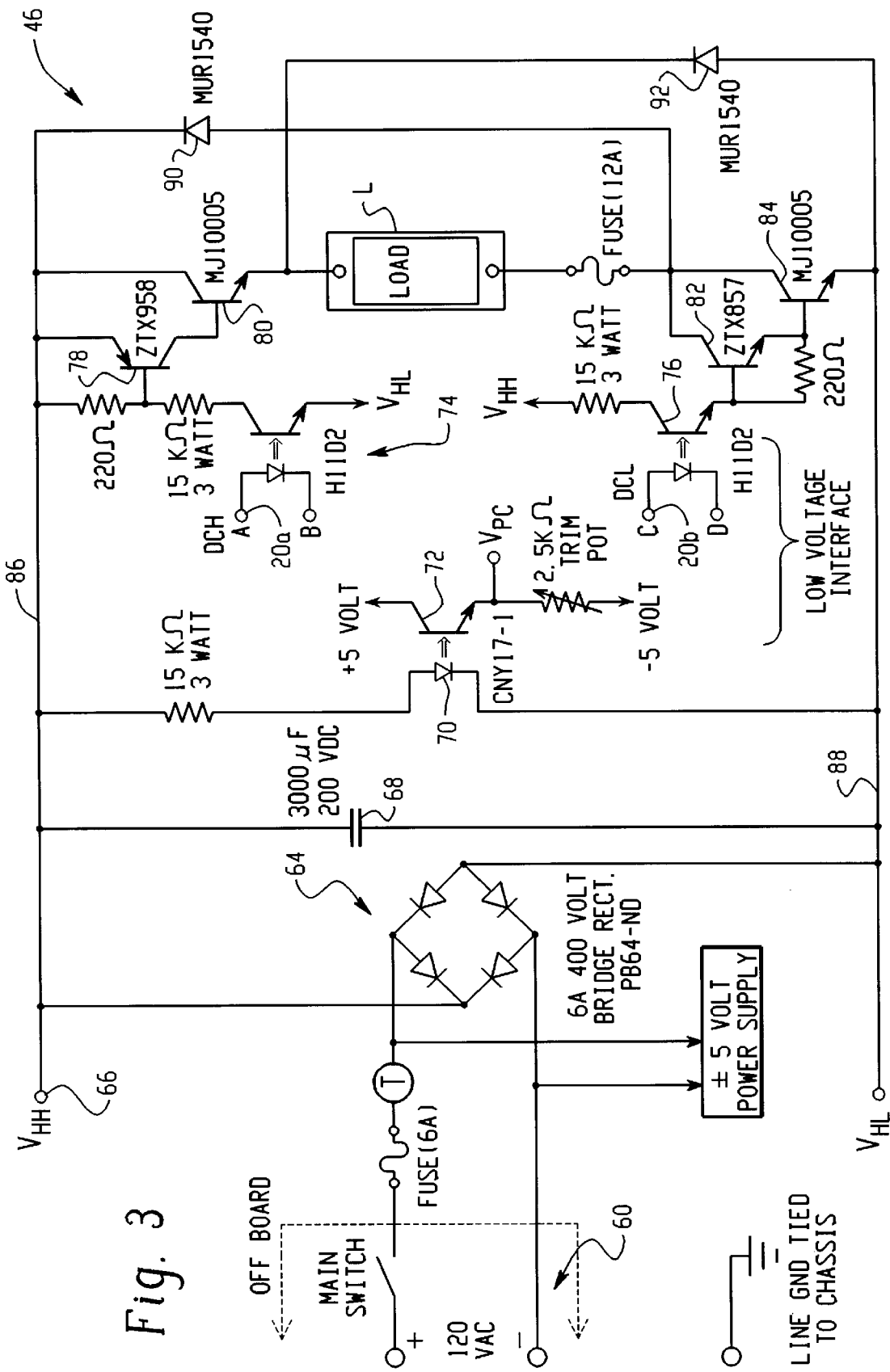
FIG. 3 is a detailed schematic diagram of a high power driver circuit and digital control interface suitable for use with the present invention.

With reference next to FIG. 3, the feeder is graphically illustrated as an electrical load L, which represents the feeder drive coils. The drive coils present an inductive load to the PWM driver circuit 46. Main power is supplied from any convenient source such as a conventional 120 volt 50–60 Hz AC outlet 60. The 120 VAC supply is also used to power a conventional and inexpensive low power DC power supply 62 which supplies the necessary power requirements for the controller 12 and related circuits.

A full wave bridge rectifier circuit 64 provides a non-isolated and unregulated high DC voltage supply 66 across the terminals labelled $V_{HH}$ and $V_{HL}$. A storage capacitor 68 (or alternatively a number of storage capacitors in parallel) is used to partially filter the DC supply 66, but a significant amount of ripple will still be present as the supply is essentially unregulated. The DC supply 66 also will fluctuate as the line voltage 60 fluctuates. In some applications, a very large capacitor 68 could be used to smooth out the DC supply 66 ripple. However, in accordance with one aspect of the invention, a significantly less expensive and smaller capacitor 68 can be used due to the compensation technique that is incorporated into the PWM software, as will be described hereinafter. In a typical worst case scenario, the DC supply 66 may operate at about 170 VDC and up to 12 amps RMS in which case the ripple is about 20–25%.

In accordance with another aspect of the invention, the use of PWM drive signals to the coils L permits a simple and low cost high voltage opto-isolation configuration. Because of the high voltages used to drive the coils L, it is important to provide isolation between the supply 66 and the low voltage electronics such as the controller 12. It is recognized that the high voltage supply 66 could be isolated with transformers, for example, but such components increase size, weight, cost and power consumption of the control circuit. In the present embodiment, isolation is accomplished by the use of photodiode/phototransistor opto-isolation switches for the capacitor voltage sense signal $V_{PC}$ and the PWM drive signals DCH and DCL.

The voltage sense detector circuit 18 for the storage capacitor 68 voltage in this case is realized with a photodiode 70 that drives a phototransistor 72 that is appropriately biased to operate in the active region. The opto-isolation device 70, 72 produces the detector 18 output signal $V_{PC}$ over a full scale range of −5 to +5 VDC corresponding to voltage variations of the high voltage DC supply 66. The signal $V_{PC}$ is provided to an analog to digital converter input to the controller 12. The opto-isolation device 70, 72 provides complete isolation of this low voltage controller 12 input signal from the high voltage DC supply 66. In a similar manner, the PWM control signals DCH and DCL are used to drive respective opto-isolation switches 74 and 76.

The PWM isolation opto-switches 74, 76 are used to switch high speed power transistors 78, 80 and 82, 84 respectively. When turned on, the high side power transistors 78, 80 connect the high voltage rail 86 to the load and the low side power transistors 82, 84 connect the low voltage rail 88 to the load, thereby completing the circuit. The opto-switches 74, 76 are pulsed on and off at a duty cycle determined by the PWM control signals 20a and 20b produced by the controller 12 so as to result in a sinusoidal force being applied to the feeder. The switching frequency for the power transistors is 4000 Hz in this embodiment as noted above. By varying the duty cycle of the pulses DCH and DCL, almost any arbitrary current waveform can be generated in the load L. Those skilled in the art will recognize the power transistor configuration as being one-half of a conventional H-bridge circuit. Positive voltages are obtained by turning on both transistor switches 74, 76 at the same time; zero voltage is obtained by leaving one transistor 74 on and the other transistor 76 off; and negative voltages are obtained by turning both transistors off. Note that current flow is always in a single direction through the load L with negative voltages arising due to the current flow through a pair of diodes 90, 92. The energy stored in the load coils' magnetic field is recaptured in the DC supply's storage capacitor 68 during the second half of each drive cycle. This results in relatively high efficiency and low power consumption compared to linear drive amplifiers. The controller 12 can be programmed as required when generating the PWM control signals DCH and DCL to compensate for time lags associated with the various switching transistors. For example, the time lags could be stored in a look-up table stored in the controller 12 memory circuit (not shown).

The amplitude control and resonant frequency tracking functions are implemented in software in the controller 12. The further use of PWM control signals and direct digital synthesis permits the entire control algorithms and PWM control signals to be produced in the digital domain, and further to provide opto-isolation between the digital outputs and the high voltage driver circuit. This results in a feeder control circuit with substantially reduced hardware components yet having a significant degree of flexibility in producing any arbitrary current waveform to the feeder coils so as to produce the desired force function (in the present embodiment, a sinusoidal force) to the feeder bowl.

In the amplitude and frequency control routine 28, in this embodiment, amplitude control has priority over frequency tracking. In other words, the closed loop amplitude control function is performed at a rate substantially faster than the frequency tracking. The amplitude control algorithm determines the waveform output 42 amplitude (voltage signal 36 in FIG. 1) required to maintain the detected vibration intensity (as detected by the motion sensor 16) at the setpoint 24 level. The amplitude control algorithm uses a standard PID control process based on a comparison of the commanded vibration amplitude setpoint 24 and the detected amplitude (output 34), and is implemented in a sampling (i.e. digital) fashion with a relatively fast sampling rate, such as, for example, 10 Hz.

The frequency tracking and control algorithm, in this embodiment, is implemented in a dither and check fashion, and thus represents a disturbance to the feeder system from the point of view of the amplitude control function. Therefore, the frequency control algorithm is performed at a much slower rate, for example, 1 Hz. In accordance with another aspect of the present invention, the frequency control algorithm in this embodiment detects the resonant frequency of the feeder by changing the drive frequency 38 a small incremental amount (dither) and then allowing the amplitude control function to adjust the drive amplitude 36 to maintain the vibration amplitude setpoint. The frequency control algorithm then checks the new drive amplitude 36 to see if it has increased or decreased from the drive amplitude 36 required at the previous frequency. Resonance is determined by searching for a relative minimum amplitude 36 required to achieve the vibration amplitude setpoint 24.

The frequency control algorithm is thus as follows:

store the present value of the commanded drive amplitude voltage signal 36;

change the drive frequency 38 by a small amount (δf), for example, 0.03 Hz;

wait for a time period, for example, 1 second, sufficient to allow the amplitude control routine to return the feeder vibration amplitude to the commanded setpoint 24;

check the new value of the commanded drive amplitude voltage signal 36;

if the new amplitude value is less than the old amplitude value, then return to step 1 and repeat;

if otherwise, replace δf with −δf and return to step 1 and repeat.

In essence, if the drive amplitude 36 is increasing as the frequency is changed, then the controller 12 knows that it likely is tuning away from the resonance frequency, and so the dither direction is reversed. If the drive amplitude required to maintain the vibration amplitude setpoint is decreasing as the frequency 38 is changed, then the controller 12 knows that it is tuning towards the resonant frequency, because at resonance the controller 12 will need a relative minimum drive amplitude to maintain the feeder at the selected vibration amplitude setpoint 24.

The frequency step size (dither) δf and the dither rate (e.g. 1 second) should be small and slow enough so that the amplitude control algorithm has sufficient time to maintain the feeder vibration amplitude at the desired setpoint level.

Although the aforementioned relative minimum drive amplitude technique for frequency tracking is preferred for the present invention, other frequency tracking techniques can conveniently be implemented with the controller 12. For example, a phase locked loop technique could be used. In such a technique, the controller 12 is programmed to search for a phase relationship between the function generator's 42 output waveform and the motion sensor 16 output signal.

The controller 12 can implement a standard PID control method to keep the phase relationship at 90 degrees which corresponds to resonance. In yet another alternative, the amplitude control loop and the frequency tracking control loop could be operated in an alternating fashion. In this technique, the amplitude control function is disabled during the frequency tracking period, and the frequency is changed to try to find a relative maximum in vibration amplitude as detected by the motion sensor 16.

For smooth quiet operation of the feeder, it is desired to excite the system with a single tone at the system's resonant frequency. In other words, it is preferred to apply a torque to the bowl in a sinusoidal fashion. The torque is produced by the pulling force of the electromagnets. Electrically, the "load" is an electromagnet. Typically, these magnets have a split magnetic core with an air gap. These are relatively inexpensive, and have the property that the magnetic force is approximately proportional to the square of the current through the coils. This is only an estimate since the air gap distance is variable. However, for most purposes, it can be assumed that the force is proportional to the square of the current. Because of this, it is not necessary that the currents in the coils flow in both directions. This allows use of a simpler driver circuit 46. In the preferred embodiment, the driver circuit 46 is realized as half of an H-bridge driver circuit configuration. A consequence of this approach is that each PWM cycle must start and end with zero current through the load L.

Figure 4:
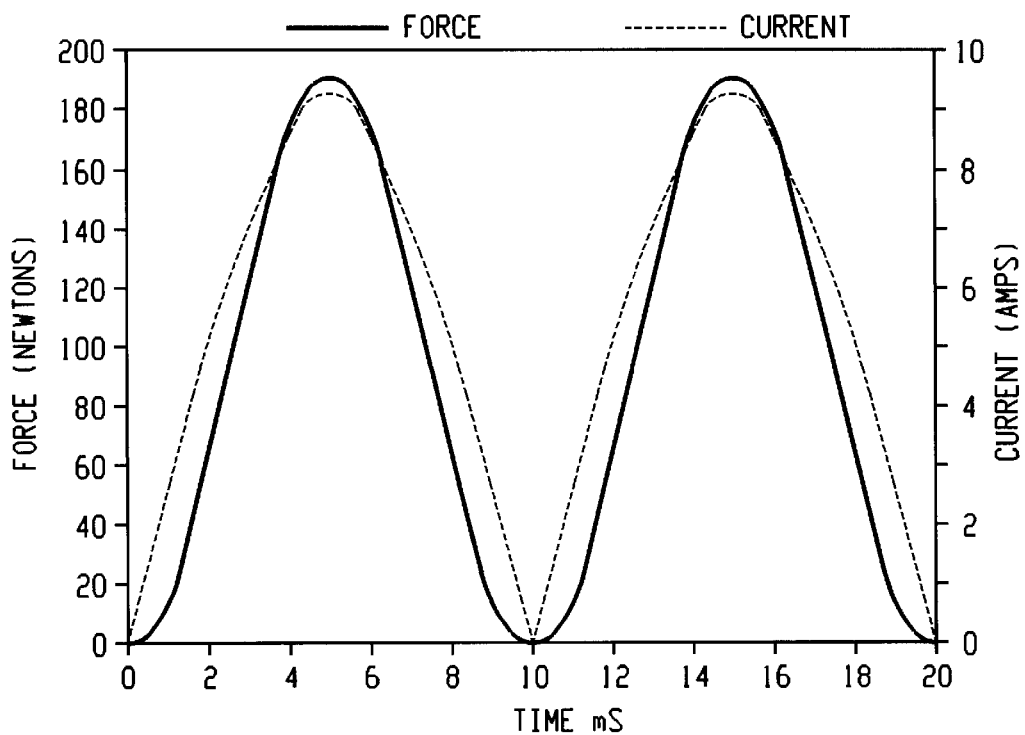
FIG. 4 is a graph that illustrates an exemplary relationship between force and drive current for a typical feeder that can be controlled with the present invention.

Because the force is proportional to the square of the current, the current should be the absolute value of a sine wave at half the driving frequency. The absolute value is used in the described embodiment to keep the driver circuit 46 simpler. FIG. 4 illustrates a typical relationship between force and current for a typical feeder bowl.

Because the load is an electromagnet, as a circuit element it is an inductor. If it is assumed to be a constant valued inductor (first order approximation), then to achieve this current, a voltage is needed which is proportional to the derivative of the current. A typical current voltage relationship is shown in FIG. 5.

Figure 5:
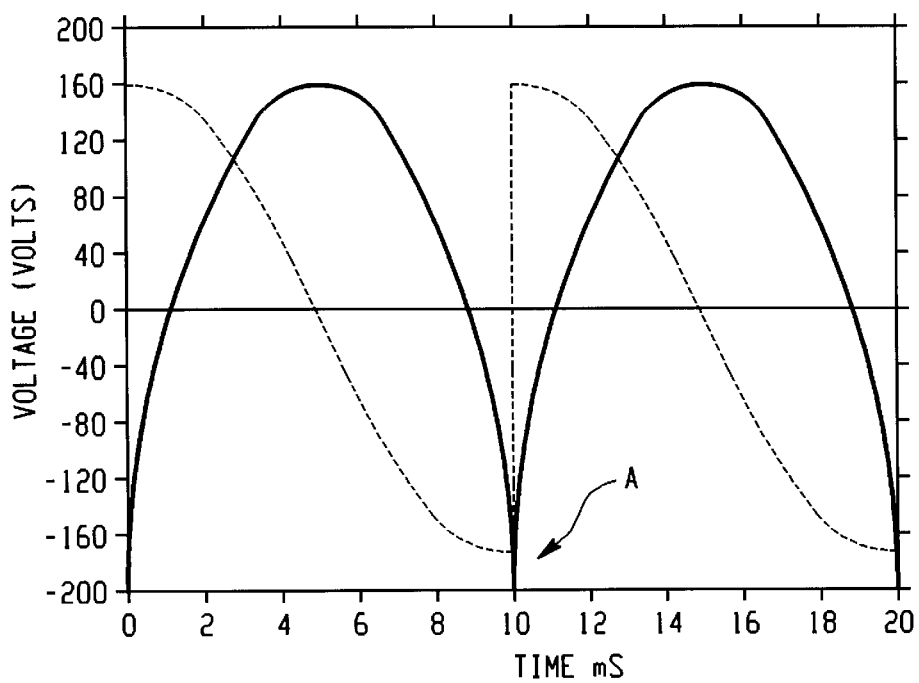
FIG. 5 is a graph that illustrates an exemplary relationship between drive current and voltage for the typical feeder characterized in FIG. 4.
Figure 6:
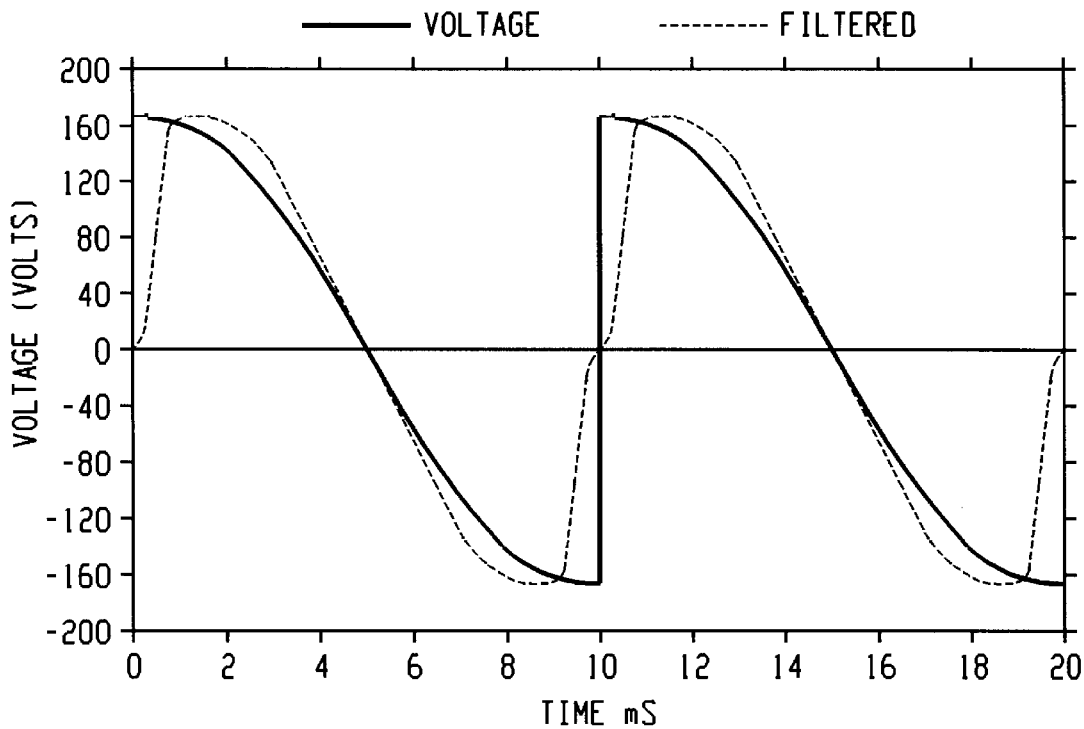
FIG. 6 is a graph that illustrates an exemplary filtered drive voltage waveform (dashed line) for a stored waveform used to develop PWM control signals in accordance with the invention.

The voltage waveform in FIG. 5 has discontinuities at the points A of zero current. The voltage applied to the coils is generated in a PWM fashion. The approach is to generate this wave via constant switching frequency digital synthesis (direct digital synthesizer or DDS). The voltage discontinuities, however, can cause power fluctuations as the DDS moves through the stored waveform. To combat this problem, the stored waveform is a filtered version of the voltage waveform in FIG. 5. The filter applied to this waveform is a high order low pass filter. For example, a 300th order filter with all real roots can be used. The cutoff frequency is set such that there is a 60 dB of attenuation at 2 KHz for the case of a drive frequency of about 160 Hz. This is done once, and the resulting voltage waveform is illustrated in FIG. 6.

Figure 7:
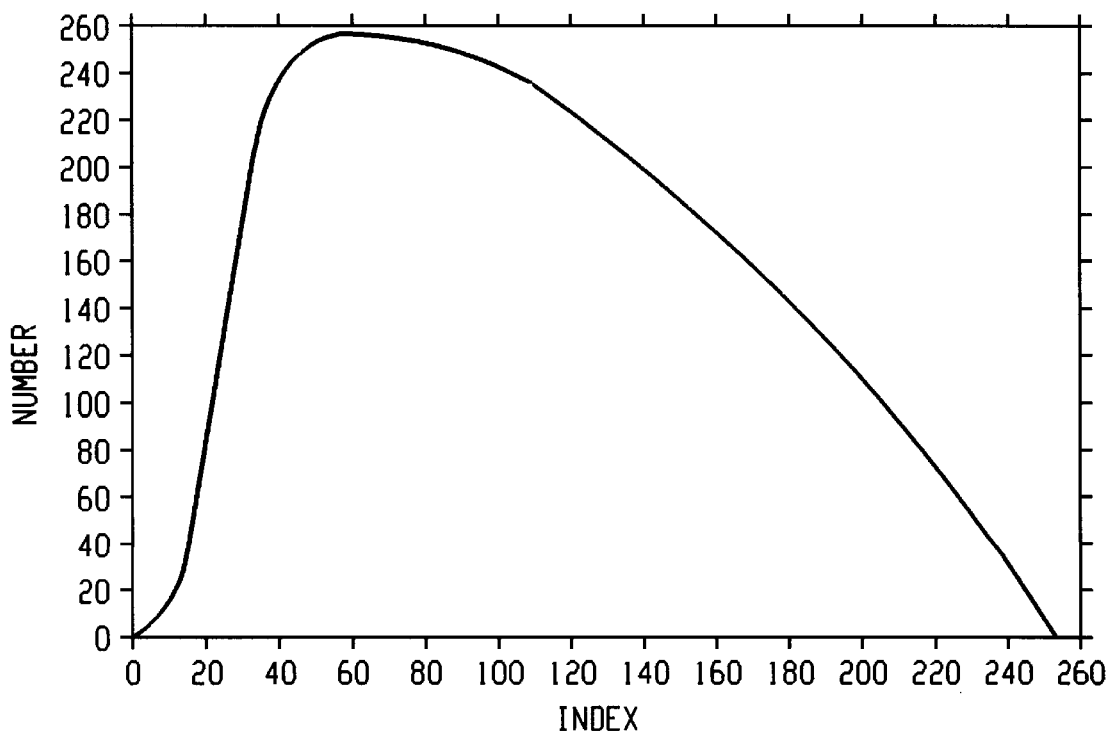
FIG. 7 is a graph of a sampled and stored voltage waveform suitable for use to develop appropriate PWM signals in accordance with the invention.

The power fluctuations being eliminated are due to the rising current variations for different starting phases of each DDS cycle. Therefore, it is only needed to filter the rising edge of the voltage waveform as illustrated in FIG. 6. However, as is apparent from FIG. 6, the voltage waveform is symmetrical about zero so that it is possible to store only the positive voltage side of this waveform, and go through the lookup table in reverse, (and change the sign) for the negative side. Thus, the function generator 40 uses 512 waveform samples which make up each cycle, but only the first half is stored in a 256 byte lookup table. Typical stored waveform data for a lookup table is graphed in FIG. 7.

It should be noted that other variable frequency drives have been used which do not achieve sinusoidal driving on the bowl. These designs typically drive the coils with a square wave, and rely on the mechanical "filtering" natural frequency of the bowl (mass-spring system) to eliminate the large amount of harmonic distortion induced by the square waves. Often a substantial amount of harmonic power still exists, effecting the performance of the bowl, and substantially increasing the operation noise which is very undesirable.

Driving the bowl with a sinusoidal force affords the ability to sweep frequencies at start-up to find the best operating frequency, as will be described hereinafter. The harmonic energy content should be low so that the bowl is not significantly excited by a harmonic of the driving frequency for cases where the frequency sweep covers more than one octave, such as the present embodiment that covers 40–160 Hz.

Due to the nonlinearity of the coil-core-bowl design, it is possible that not all the stored energy in the magnetic field is removed during the bottom half of the cycle. When this occurs, the current will not completely make it back to zero. This residual current builds up on the next cycle and the next cycle and so on, resulting in a net DC offset of the bowl current. This DC offset can get to be quite large, and is not stable. It results in unstable bowl performance, and excessive coil heating. To combat this problem, the last PWM value of each cycle is set to the negative maximum. During this time, the transistors are both fully off, squeezing out the last bit of energy and forcing the current to zero.

Figure 8:
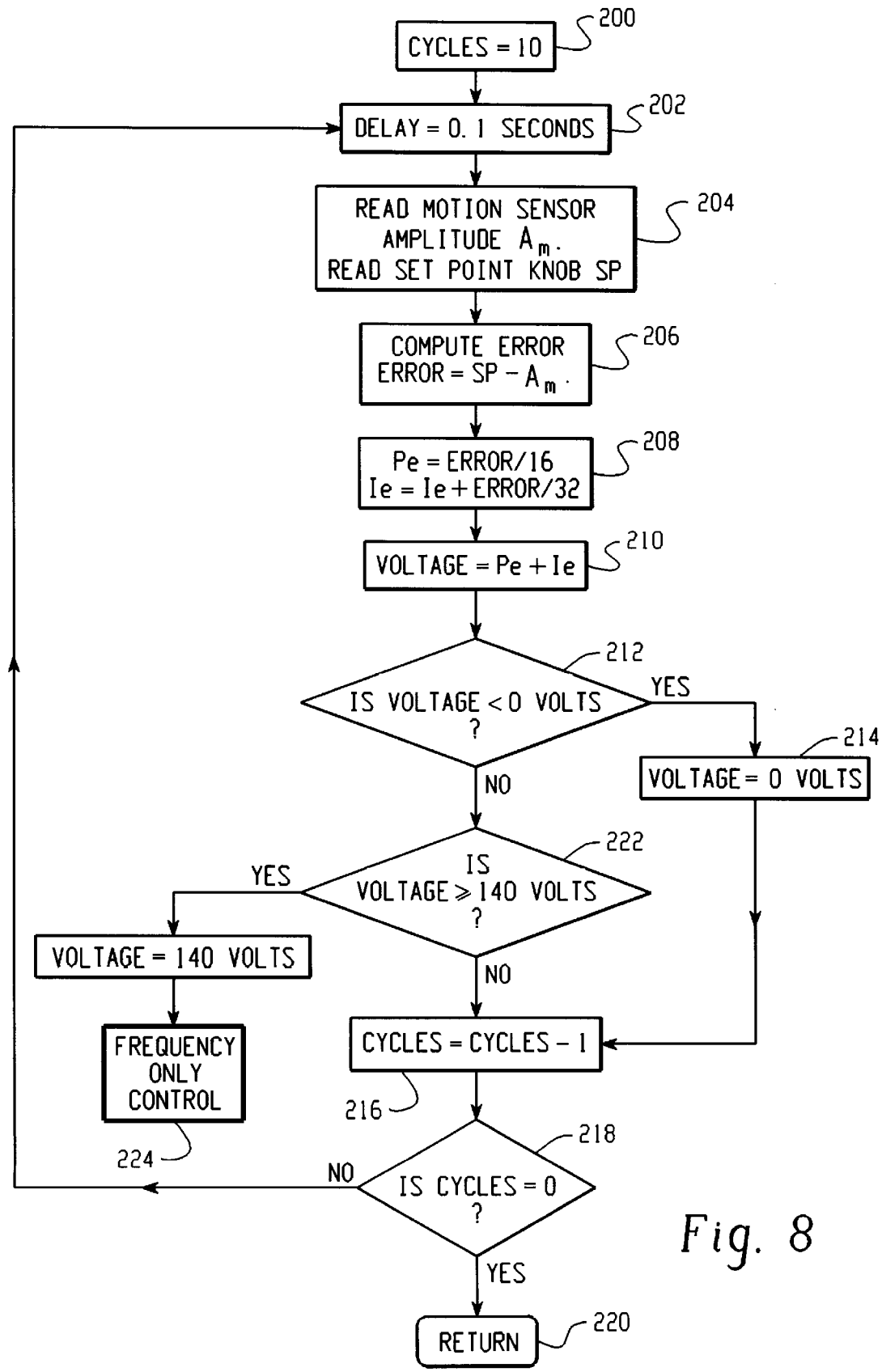
FIG. 8 is a flow chart for an amplitude control algorithm in accordance with the present invention.

The various functional blocks identified for the controller 12 in FIG. 1 are performed in software. Suitable exemplary flow diagrams for these control functions and algorithms will now be described. With reference next to FIG. 8, the amplitude control process algorithm is performed for a selected number of cycles such as 10, for example, at step 200. A suitable delay period at step 202, for example 0.1 seconds, is used to allow the system 10 to stabilize prior to each data sampling cycle. At step 204 the motion sensor data, as converted to velocity corresponding to vibration amplitude $A_m$ in this embodiment, is read; the vibration amplitude setpoint 24 input by the operator is also read at this time. At step 206 an error value is calculated as the difference between the vibration amplitude setpoint and the actual vibration amplitude $A_m$. The PID process is carried out in steps 206, 208 and 210, where Pe is a value that is proportional to the present value of the error; and Ie is a value that is proportional to the integral of the error. In the described embodiment, a PI only controller is used.

The result of step 210 is a value "Voltage" which corresponds to the drive amplitude voltage signal 36 required to drive the feeder at the setpoint vibration amplitude. At step 212, if the value Voltage is less than 0, it is set to a zero value at step 214 and the program advances to step 216 where the cycle counter is decremented by one. At step 218 if all ten cycles have not been performed the system loops back to step 202. If all ten cycles are completed, then the program returns to the executive command control function at step 220.

At step 212, if the vibration amplitude drive Voltage is greater than 0, then at step 222 the system checks if the value Voltage is greater than a predetermined value, in this example 140 volts. If the result is yes, the program branches to a frequency only control routine at step 224. Otherwise, the program advances to step 216 and continues as previously described above.

The Voltage check at step 224 is performed to detect a sudden or substantial change in the resonant frequency of the feeder. Such a situation could arise, for example, if a spring broke. A sudden and/or substantial change in the feeder resonant frequency causes the controller 12 to quickly increase the driving power or amplitude to a maximum (e.g. the 140 volt value), and still not reach the desired vibration amplitude setpoint 24. The controller 12 then switches to a larger step dither and check routine 224 in an effort to quickly locate the new resonant frequency. Since the drive amplitude is at the maximum, the larger step dither function is performed as a frequency only control routine 224 without the amplitude control function (FIG. 8) operating. As long as the present vibration amplitude is less than the setpoint value 24, and the vibration drive amplitude is at the preselected maximum, the frequency only control routine 224 is used. Once the present value of vibration amplitude exceeds the setpoint value 24, the controller 12 immediately returns the system to the amplitude control routine of FIG. 8 (along with the normal frequency tracking routine of FIG. 9 to be described next).

Figure 9:
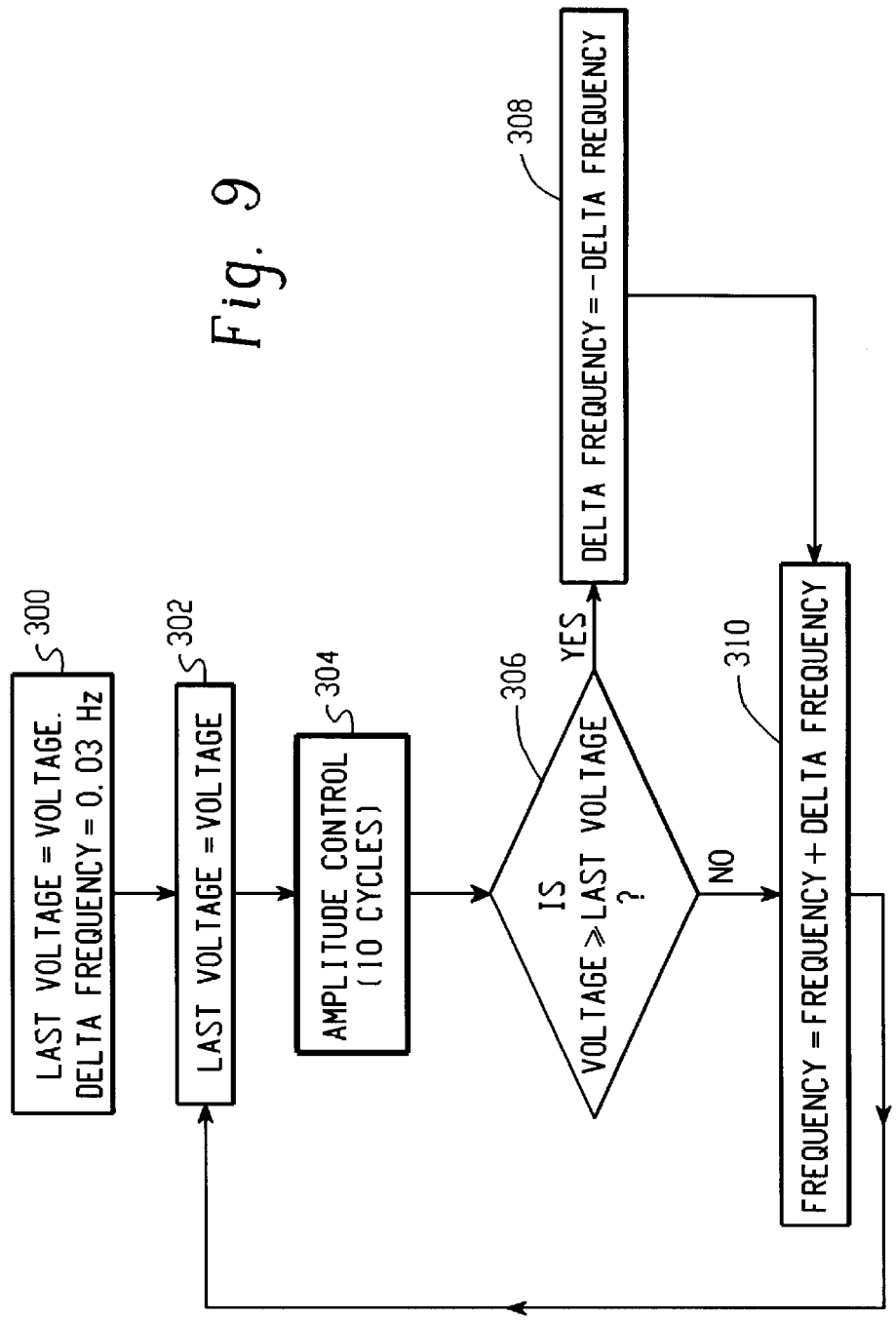
FIG. 9 is a flow chart for a frequency tracking control algorithm in accordance with the present invention.

FIG. 9 is a flow diagram of a suitable frequency tracking algorithm in accordance with the present invention. At step 300 the controller 12 stores the present Voltage value as indicated by the amplitude voltage signal 36. The dither step size If is retrieved also. At step 302 a control parameter "Last Voltage" is set to the present Voltage value. At step 304 the controller 12 executes the Amplitude Control routine of FIG. 8, and at step 306 checks the new value of the amplitude voltage signal 36. If the new value exceeds the old value, then the dither direction is reversed at step 308 by setting the value $\delta f$ to $-\delta f$. At step 310 the dither step value $-\delta f$ is then added to the present drive frequency value 38 and the program loops back to step 302. Thus the normal frequency control algorithm runs continuously at a selected rate much slower than the amplitude control routine 304 (in this example at 1/10th the rate). The routine thus continuously searches for and maintains the drive frequency 38 at the resonant frequency of the feeder by searching for the minimum drive amplitude value 36 needed to maintain the feeder vibration amplitude at the setpoint value 24.

It should be noted that in this embodiment of the frequency tracking function carried out by the controller 12, the resonant frequency is determined based on detecting a relative minimum in the applied drive amplitude 36. This avoids the need for phase lock loop control in this embodiment.

Figure 10:
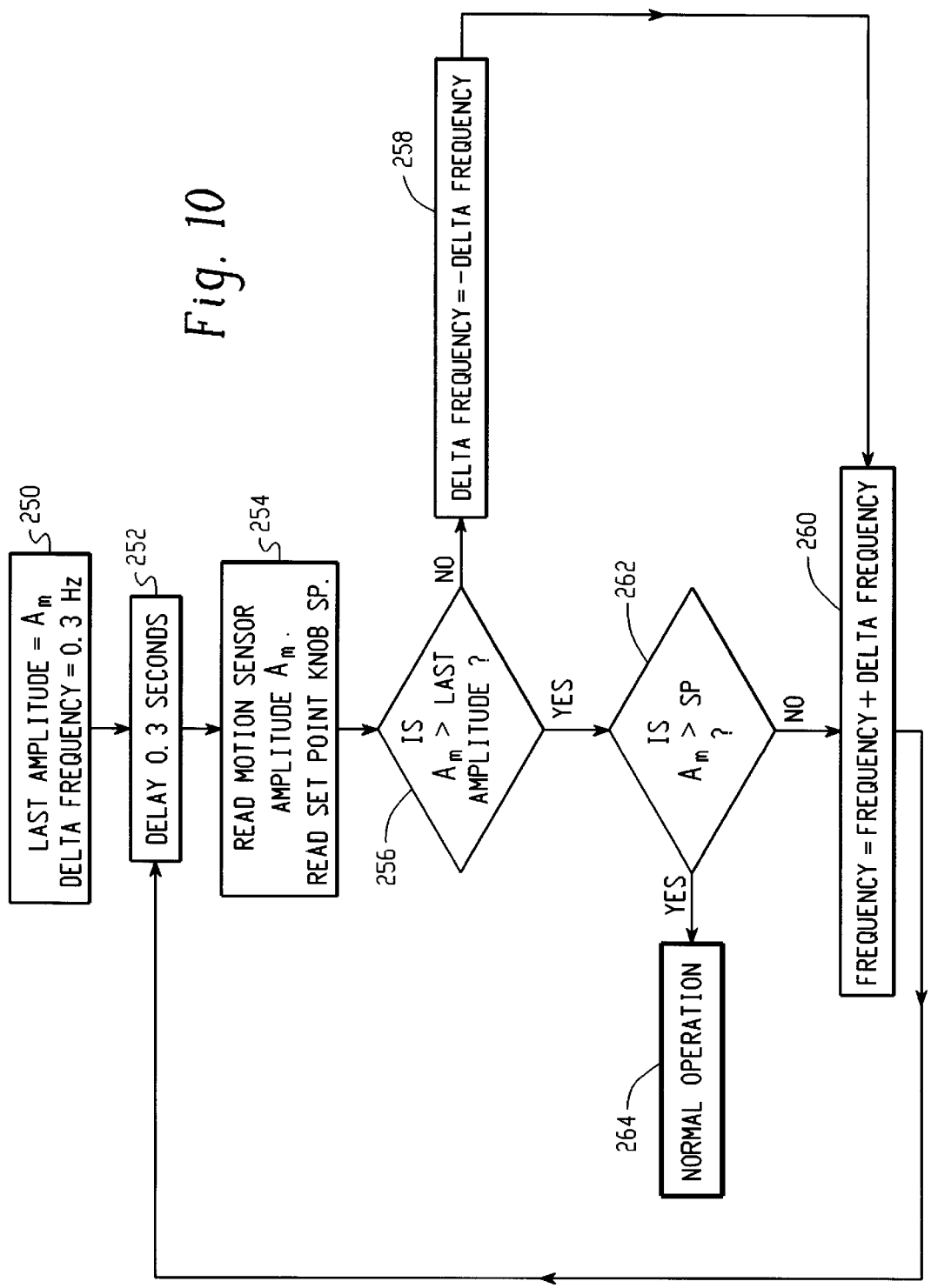
FIG. 10 is a flow chart for a frequency only tracking control algorithm in accordance with the present invention.

With reference to FIG. 10, the Frequency Only routine 224 (see discussion as to FIG. 8) is illustrated. At step 250 the present vibration amplitude is determined as value $A_m$ and the dither frequency step $\delta f$ is retrieved. Note that in the Frequency Only mode, the dither step size is significantly larger so that the controller 12 can more quickly search and tune towards the resonant frequency of the feeder. After an appropriate stabilization delay at step 252, the present vibration amplitude (the new $A_m$ value) is determined from the motion sensor 16 and the setpoint value is retrieved, both at step 254. At step 256 the system checks if the present vibration amplitude $A_m$ is greater than the last vibration amplitude value. If not, the dither direction is reversed at step 258, the drive frequency 38 is incremented by the dither step value at step 260, and the program loops back to step 252 to continue to try to find the resonant frequency. If the frequency step caused the vibration amplitude value to increase (result is Yes at step 256), the program checks if the vibration amplitude exceeds the vibration amplitude setpoint value 24 at step 262. If the result is Yes, the controller 12 returns the system to the normal operation mode at step 264, which causes the system to operate under the control algorithms if FIGS. 8 and 9. If the result at step 262 is negative, the drive frequency 38 is incremented by the dither step value δf at step 260 and the program returns to step 252 to continue searching for the resonant frequency in the same direction of dither step change.

Figure 11:
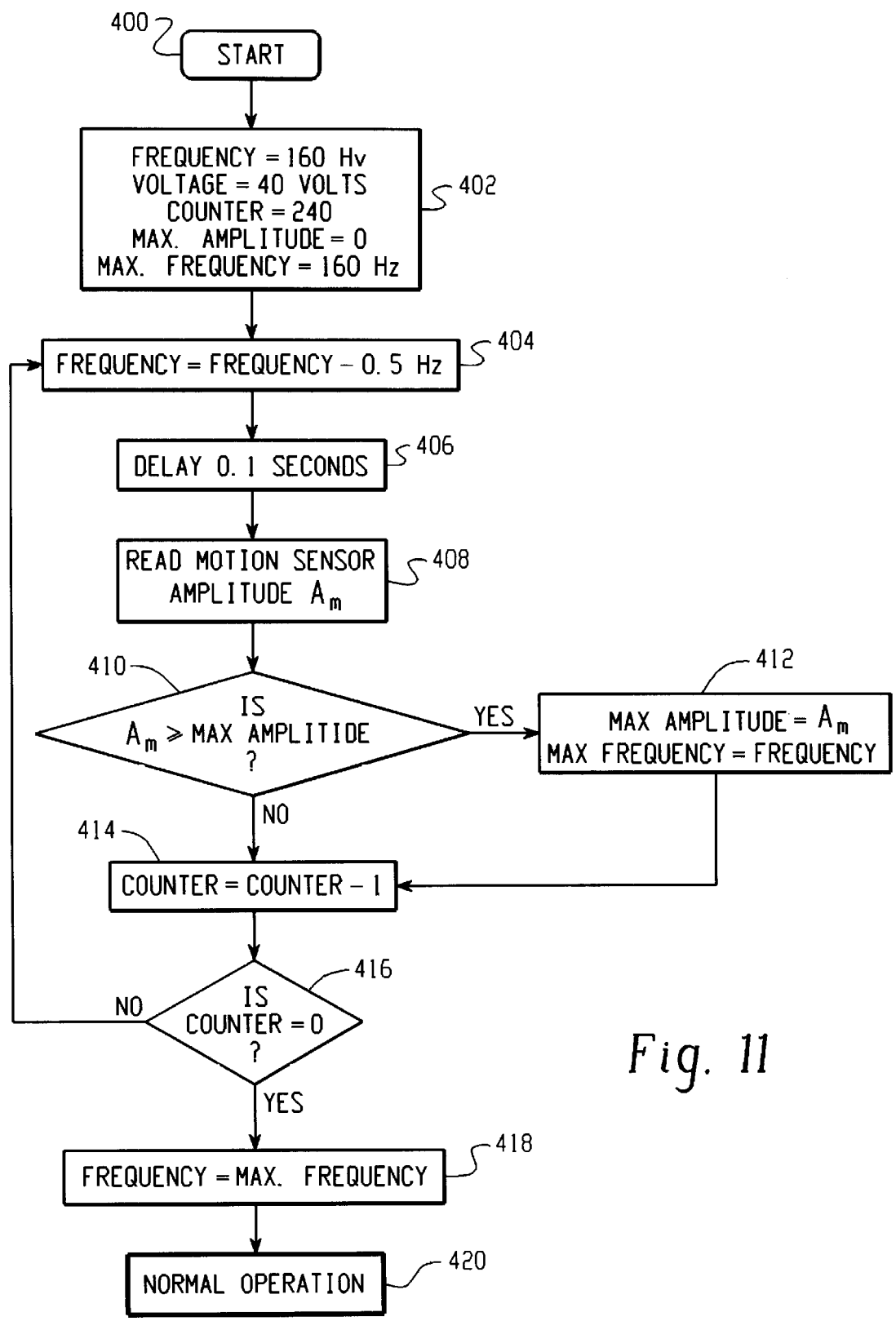
FIG. 11 is a flow chart for a start-up frequency sweep control algorithm in accordance with the present invention.

At system start-up it is desirable for the controller 12 to locate the feeder resonant frequency as quickly as possible. A separate start-up control routine can be used for this purpose if required, and FIG. 11 provides an exemplary process suitable for use with the present invention. When system start is commanded at step 400 (such as, for example, by activation of a power on main switch, see FIG. 3), the controller 12 initializes several control parameters at step 402. The initial drive frequency 38 is set to a selected maximum, which typically is determined based on the overall feeder design, for example, 160 Hz. An typical drive amplitude 36 is also preset, and a default number of frequency steps is set, such as, for example, 240 steps at 0.5 Hz per step. Other initial conditions can be used is needed. For example, the feeder could initially be excited at a mid-range frequency or an expected resonant frequency based on empirical results or prior operations.

At step 404 the drive frequency 38 is decremented and at step 406 a delay period is imposed to allow the feeder system to respond to the new frequency. Note that during this start-up routine the amplitude control function (such as in FIG. 8 for example) is disabled and the drive amplitude 36 is held fixed. At step 408 the controller 12 reads the actual vibration amplitude $A_m$ as detected using the motion sensor 16. At step 410 the actual vibration amplitude $A_m$ is compared to the present maximum value (initially set to 0 at step 402), and if greater the maximum value is set to the present vibration amplitude at step 412 and the maximum frequency value (initially preset to the start frequency of 160 Hz) is set to the present frequency 38 value. The counter is then decremented at step 414 and the system loops back to step 404 if the total number of iterations as checked at step 416 has not been reached. In this manner, the controller 12 keeps adjusting the frequency down as long as the vibration amplitude as detected using the motion sensor 16 indicates that the vibration amplitude is increasing, meaning that the feeder drive frequency is approaching resonance.

Eventually, the actual vibration amplitude $A_m$ will fall below the last stored maximum vibration amplitude value, and this will be detected as a negative result at step 410, and further will be an indication that the resonant frequency has been detected. After all iterative steps are completed at step 416 the program advances to step 418 and assigns the drive frequency 38 the value of the frequency at which the maximum vibration amplitude was detected (within 0.5 Hz of the resonant frequency) and the system returns to normal amplitude control and frequency tracking at step 420 as previously described hereinabove.

Figure 12:
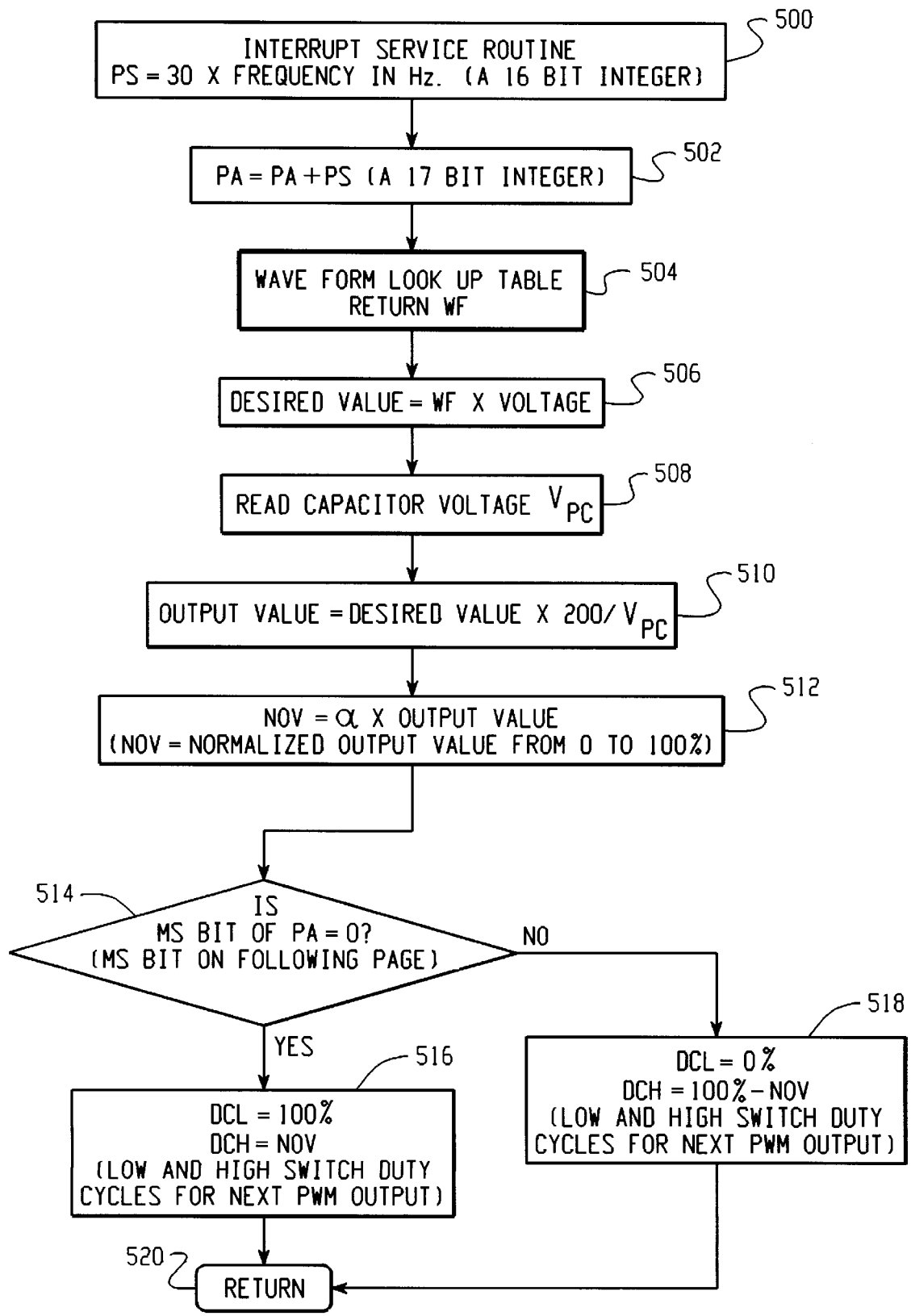
FIG. 12 is a flow chart for a PWM control algorithm that includes voltage supply compensation in accordance with the present invention.

As described hereinbefore, the controller 12 includes a function generator 40 that is used to generate the DCH and DCL PWM control signals 20a and 20b. The function generator 40 includes a look-up table that stores a selected number of samples, in this case 256, of a single waveform (such as FIG. 7). In accordance with one aspect of the invention, in developing the DCH and DCL signals the controller 12 takes into account the voltage fluctuations on the unregulated DC supply storage capacitor 68 (FIG. 3). A suitable control algorithm for the PWM switching controller 22 is shown in FIG. 12 for generating the PWM control signals, including the compensation for capacitor 68 voltage variations. The opto-isolation switches 74, 76 are turned on for a duration that is determined by the respective pulse times of the signals DCH and DCL, with the actual duration being equal to the duty cycle times 250 μsec (in the present embodiment that uses a switching frequency of 4000 Hz). The process of FIG. 12 is executed on a real time basis at 4000 times per second (the PWM switching frequency in this case) with real time interrupt.

In FIG. 12, at an interrupt service step 500 a sixteen bit integer variable PS ("phase step") is set at a selected step size, in this case 30 times the commanded drive frequency 38. The value PS is selected based on the desired drive frequency 38 as a result of the frequency tracking algorithm used to drive the system at resonance.

At step 502 a variable PA (phase accumulator) is computed by adding the PS value to the old PA value (initially PA is set to zero). The program at step 504 then accesses the waveform look-up table and returns the waveform data.

Figures 13A, 13B:
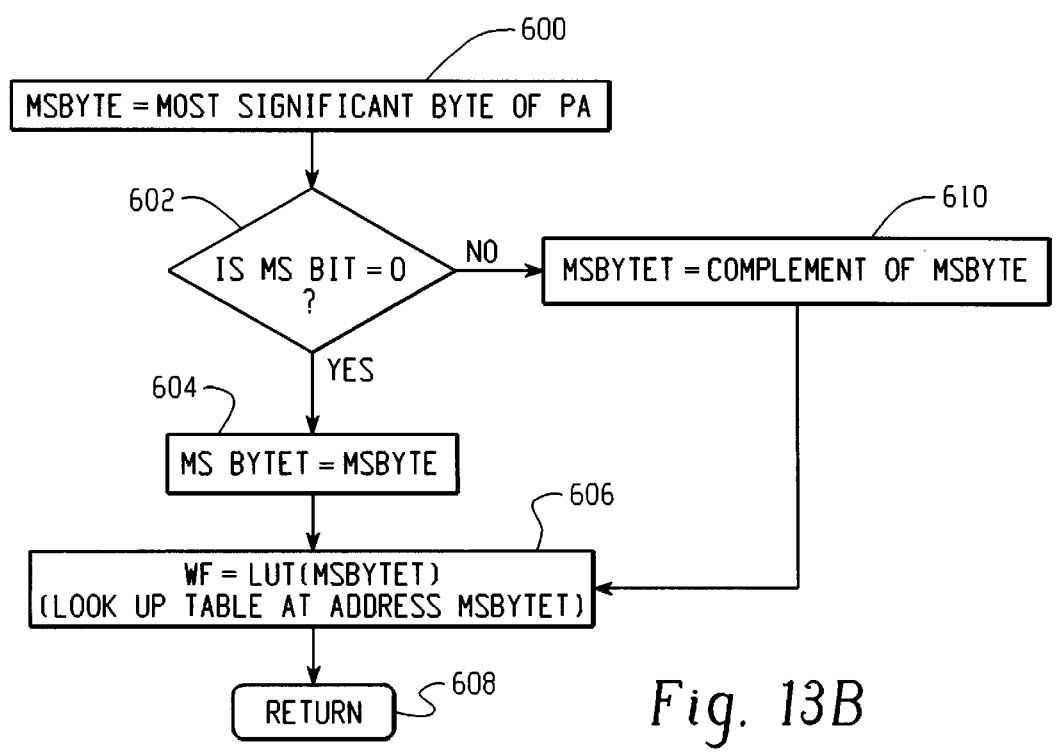
FIGS. 13A and 13B are a flow chart for a waveform look-up algorithm in accordance with the present invention.

The waveform look-up table access is implemented with a separate routine such as shown in FIGS. 13A and 13B. As represented in FIG. 13A, the value PA is a seventeen bit integer that includes a most significant bit (MS Bit), and a most significant byte (MS Byte) and a least significant byte (a byte=8 bits). Since the look-up table only stores half of the desired waveform for a complete PWM cycle, the MS Bit is used to determine which half of the drive waveform the controller 12 is generating from the look-up table data during each access. In FIG. 13B, at step 600 the value MS Byte is set to the most significant byte value of PA, in essence simply truncating the least significant byte (keeping in mind that the value PA is incremented in large steps as determined by the value PS in step 500 (FIG. 12). At step 602 if the MS Bit is 0 then the MS Byte value is left unchanged at step 604 and the waveform (WF) is retrieved from the look-up table (LUT) at step 606 by using the value MS Byte as the address for the look-up table. The data retrieved from the LUT associated with the waveform WF corresponds to the sampled data point in the stored waveform that will be generated in the feeder coils by the PWM signals 20a and 20b generated by the PWM control algorithm 22. At step 608 the program returns to the PWM algorithm at step 504 (FIG. 12). If at step 602 the MS Bit value was not 0 (i.e. 1), then the program goes to step 610 and assigns the MS ByteT value to be the complement of the most significant byte of the value PA because the controller 12 is accessing in reverse order the opposite half of the stored waveform in the LUT. Again the program then returns to step 504 of the algorithm in FIG. 12.

At step 506 a variable "Desired Value" is set to the waveform sample value WF times the value "voltage" which is the amplitude control voltage 36 determined during the amplitude control algorithm to maintain the feeder at the vibration amplitude setpoint. This "Desired Value" calculation, however, is then compensated for variations in the storage capacitor 68 voltage. Otherwise, the unregulated voltage supply 66 could cause improper waveforms to be generated in the feeder coils. At step 508 the capacitor 68 voltage is read from the sensor 18 as the value $V_{PC}$. At step 510 a variable "Output Value" is calculated by multiplying the "Desired Value" by a ratio of $200/V_{PC}$ where 200 is the predetermined maximum desired DC voltage value of the supply 66.

At step 512 the Output Value calculated at step 510 is normalized using a factor a such that the calculated value NOV (normalized output value) ranges from 0 to 100% duty cycle for the PWM control. At step 514, if the most significant bit of the value PA is zero (corresponding in this embodiment to a command of positive voltage at the load), then at step 516 the signal DCL is turned on for a 100% duration of the present cycle and the signal DCH is turned on for a duty cycle set by the value NOV. If at step 514 the most significant bit of the value PA is one (corresponding in this embodiment to a command of negative voltage at the load), then at step 518 the signal DCL is turned off for a 100% duration of the present cycle and the signal DCH is turned off for a duty cycle set by the value 100%-NOV. After either step 516 or 518 the system returns at step 520 by completing the interrupt service routine of FIG. 12 and continues cycling through the LUT to generate the desired waveform at the load. It should be recalled that throughout the process of FIG. 12, the amplitude control algorithm is continuously updating the amplitude value 36 ("voltage" in FIG. 12) and the frequency tracking algorithm is updating the drive frequency 38 value used in step 500 to maintain the feeder at resonance and at the desired vibration amplitude.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. Apparatus for controlling a vibrating feeder having one or more electromagnetic drive coils, comprising: a DC power supply; a controller that produces drive control signals based on a selectable vibration amplitude; and a switching driver circuit that switches DC power to the drive coil in response to said control signals to produce unidirectional drive current through said coil and a substantially sinusoidal driving force.

2. The apparatus of claim 1 comprising a motion sensor that detects vibration amplitude of the feeder and produces a feedback signal representing said vibration amplitude wherein said vibration sensor produces a feedback signal related to feeder velocity to said controller.

3. The apparatus of claim 2 wherein said motion sensor operates independent of the drive coil signals.

4. The apparatus of claim 1 wherein said controller adjusts said control signals so that the feeder vibrates substantially at its resonant frequency.

5. The apparatus of claim 4 wherein said controller adjusts said signals to drive the feeder at resonance by detecting a minimum drive amplitude required to maintain the feeder at a selected vibration amplitude.

6. The apparatus of claim 1 wherein said DC power supply comprises an unregulated supply.

7. The apparatus of claim 1 wherein said DC power supply includes a storage capacitor, and said controller detects voltage variations on said capacitor and adjusts said control signals based on said detected voltage variations.

8. The apparatus of claim 1 wherein said control signals are produced in the controller according to a selected software algorithm.

9. The apparatus of claim 1 wherein said controller produces control signals which when applied to the driver circuit and the drive coils causes a substantially sinusoidal vibrational force on the feeder.

10. The apparatus of claim 1 wherein said DC power supply comprises a high voltage supply, and said driver circuit comprises opto-isolation switches that optically isolate said high voltage DC power supply from low voltage logic circuits in the apparatus.

11. The apparatus of claim 1 wherein said controller uses a look-up table to store a predetermined waveform that is used by the controller for direct digital synthesis of a current/voltage waveform at the feeder coils using pulse width modulated (PWM) control signals.

12. The apparatus of claim 11 wherein said current/voltage waveform causes a substantially sinusoidal torque to be applied to the feeder.

13. The apparatus of claim 12 wherein said stored predetermined waveform comprises a filtered voltage waveform that represents a first half cycle coil drive signal at the PWM switching frequency.

14. The apparatus of claim 13 wherein said controller operates on the digital complement of said stored waveform to produce a second half cycle coil drive signal at the PWM switching frequency.

15. The apparatus of claim 1 wherein said drive control signals produce said unidirectional current through said coil and bi-directional coil voltage.

16. The apparatus of claim 1 wherein said controller produces said drive control signals as pulse width modulated signals.

17. The apparatus of claim 1 wherein said controller produces said control signals as pulse width modulated signals and wherein said PWM drive control signals produce a substantially sinusoidal driving function.

18. Apparatus for controlling vibratory machines of the type having at least one electromagnetic drive coil to drive a member at a resonant frequency, comprising: a DC power supply; a programmable controller that produces PWM control signals that when applied to the drive coil cause vibrating motion; a switching driver circuit that applies a drive waveform to the drive coil by switching DC power to the drive coil in response to the PWM control signals; and a motion sensor that detects vibration amplitude; said controller tracking resonant vibration frequency as a function of an amplitude signal related to said drive waveform.

19. The apparatus of claim 18 wherein said controller detects resonant frequency by locating a relative minimum drive amplitude applied to the drive coil while dithering the drive frequency.

20. The apparatus of claim 19 wherein said relative minimum drive amplitude is determined by a comparison of a commanded vibration amplitude setpoint and vibration velocity feedback from said motion sensor.

21. The apparatus of claim 18 wherein said controller also controls vibration amplitude based on a selected vibration amplitude setpoint and vibration velocity feedback from said motion sensor.

22. The apparatus of claim 21 wherein said controller detects vibration resonant frequency by changing the drive frequency an incremental amount to disturb the vibration amplitude, holding the new frequency while adjusting the vibration amplitude back to said setpoint, and searching for a relative minimum in a drive amplitude signal after a plurality of said incremental changes in the drive frequency.

23. The apparatus of claim 18 wherein said motion sensor operates independent of the drive coil.

24. Method for controlling vibratory equipment of the type having at least one electromagnetic drive coil, comprising the steps of:

a) applying PWM drive signals to the drive coil to produce a substantially sinusoidal driving function and vibratory motion with unidirectional current through the coil;

b) detecting the vibratory motion with a motion sensor;

c) producing an amplitude drive control signal based on a selected vibration amplitude setpoint and said detected vibratory motion; and d) producing a frequency drive control signal based on said amplitude drive control signal;

said amplitude and frequency drive control signals being used to produce said PWM drive signals.

25. The method of claim 24 wherein the step of producing the frequency drive control signal includes the step of determining a relative minimum in the amplitude drive control signal as the drive frequency is incrementally dithered.

26. The method of claim 25 wherein said frequency drive control signal is controlled at a substantially slower rate than said amplitude drive control signal.

27. The method of claim 26 wherein said amplitude drive control signal is adjusted towards said selected setpoint between each dither operation.

28. The method of claim 24 wherein the motion sensor is used to produce a signal related to vibration velocity independent of the drive coil.

29. Apparatus for producing PWM control signals to generate a desired output waveform, comprising: an unregulated DC power supply; the DC supply having a storage capacitor; a sensor for detecting voltage on the storage capacitor; and control means for generating said PWM control signals: said control means producing said PWM control signals with a variable duty cycle that is a function of said detected capacitor voltage to generate the desired output voltage.

30. The apparatus of claim 29 wherein said control means operates on a low voltage supply and comprises opto-isolation means for isolating low voltage signals from said DC power supply.

31. The apparatus of claim 30 wherein said sensor comprises a photodiode in parallel with the storage capacitor and a phototransistor that is optically coupled to said photodiode and that produces a signal related to the storage capacitor voltage.

32. The apparatus of claim 30 wherein the control means comprises a switching circuit that switches high voltage DC power to a load in response to said PWM control signals; said switching circuit comprising opto-isolation switches to isolate low voltage PWM control signals from said high voltage DC power.

33. Apparatus for controlling vibratory machines of the type having at least one electromagnetic coil to drive a member substantially at a resonant frequency, comprising: a controller that produces drive control signals that produce a substantially sinusoidal driving force when said control signals are applied to the drive coil to cause vibrating motion; and a motion sensor that detects vibration amplitude; said controller tracking resonant vibration frequency as a function of an amplitude characteristic of said drive control signals.

34. The apparatus of claim 33 wherein said controller detects resonant frequency by locating a relative minimum drive amplitude applied to the drive coil while dithering the drive frequency.

35. The apparatus of claim 34 wherein said relative minimum drive amplitude is determined by a comparison of a commanded vibration amplitude setpoint and vibration velocity feedback from said motion sensor.

36. The apparatus of claim 33 wherein said controller also controls vibration amplitude based on a selected vibration amplitude setpoint and vibration velocity feedback from said motion sensor.

37. The apparatus of claim 36 wherein said controller detects vibration resonant frequency by changing the drive frequency an incremental amount to disturb the vibration amplitude, holding the new frequency while adjusting the vibration amplitude back to said setpoint, and searching for a relative minimum in a drive amplitude signal after a plurality of said incremental changes in the drive frequency.

38. The apparatus of claim 33 wherein said motion sensor operates independent of the drive coil.

39. Apparatus for controlling vibrating machines of the type having at least one electromagnetic drive coil to drive a member at a resonant frequency, comprising: a DC power supply; a controller that produces drive control signals that when applied to the drive coil cause vibrating motion; a driver circuit that applies a drive waveform to the drive coil by switching DC power in response to said drive control signals; and a motion sensor that detects vibration amplitude and produces a sensor signal related thereto; said controller tracking resonant vibration frequency as a function of an amplitude signal related to said drive waveform and said sensor signal.

* * * * *

UNITED STATES PATENT AND TRADEMARK OFFICE
CERTIFICATE OF CORRECTION

PATENT NO. : 5,883,478
DATED : Mar. 16, 1999
INVENTOR(S) : William Henry Thesling It is certified that error appears in the above-identified patent and that said Letters Patent is hereby corrected as shown below:

Column 10, Line 26, please delete "1F" and insert -- $\delta f$ --.

Column 12, Line 65, please delete the second instance of "a" and insert -- $\alpha$ --.

Signed and Sealed this

Twenty-sixth Day of October, 1999

Attest:

Q. TODD DICKINSON

Attesting Officer

Acting Commissioner of Patents and Trademarks